(12) United States Patent
Yoshimura et al.

(10) Patent No.: US 10,696,248 B2
(45) Date of Patent: Jun. 30, 2020

(54) GROMMET

(71) Applicants: Yazaki Corporation, Tokyo (JP);
TOYOTA JIDOSHA KABUSHIKI KAISHA, Toyota-shi, Aichi-ken (JP)

(72) Inventors: Katsuya Yoshimura, Toyota (JP);
Ryohei Toyoda, Toyota (JP); Yasunori Hattori, Toyota (JP); Tomoyoshi Katayama, Miyoshi (JP); Akinori Ishikawa, Toyota (JP)

(73) Assignees: YAZAKI CORPORATION,
Minato-ku, Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/559,809

(22) Filed: Sep. 4, 2019

(65) Prior Publication Data
US 2020/0079303 A1    Mar. 12, 2020

(30) Foreign Application Priority Data

Sep. 10, 2018  (JP) ................................. 2018-168716

(51) Int. Cl.
| B60R 16/02 | (2006.01) |
| H02G 3/22 | (2006.01) |
| H02G 15/013 | (2006.01) |
| H01B 17/58 | (2006.01) |

(52) U.S. Cl.
CPC ........... *B60R 16/0222* (2013.01); *H02G 3/22* (2013.01); *H02G 15/013* (2013.01); *H01B 17/583* (2013.01)

(58) Field of Classification Search
CPC .... B60R 16/0222; H02G 3/22; H02G 15/013; Y10T 16/05; H01B 17/583
USPC ......................................... 174/152 G, 153 G
See application file for complete search history.

(56) References Cited

U.S. PATENT DOCUMENTS

| 3,351,974 | A | * | 11/1967 | Wilhelmi | E05B 85/08 16/2.1 |
| 5,774,934 | A | * | 7/1998 | Fujita | B60R 16/0222 16/2.1 |
| 10,192,657 | B2 | * | 1/2019 | Ujita | B60R 16/0207 |
| 2002/0036097 | A1 | | 3/2002 | Okuhara et al. | |

(Continued)

FOREIGN PATENT DOCUMENTS

| JP | 2002-171646 A | 6/2002 |
| JP | 2007-276558 A | 10/2007 |

*Primary Examiner* — Roshn K Varghese
(74) *Attorney, Agent, or Firm* — Sughrue Mion, PLLC

(57) ABSTRACT

A grommet includes an inner side harness insertion portion extending toward an inner side of a vehicle, an outer side harness insertion portion extending toward an outer side of the vehicle, a lip mountain base integrated with the inner side harness insertion portion, a lip mountain integrated with the lip mountain base, a panel abutment portion abutting on a periphery of the through hole in an outer side surface of a vehicle body panel, a connection portion connecting the lip mountain and the panel abutment portion, a work unit formed across the outer side harness insertion portion and the panel abutment portion, and a work pressing portion integrated with the outer side harness insertion portion and the work unit. A plurality of recesses are formed between facing surfaces of the work pressing portion and radially arranged about a central axis of the outer side harness insertion portion.

6 Claims, 7 Drawing Sheets

(56) References Cited

U.S. PATENT DOCUMENTS

| | | | |
|---|---|---|---|
| 2002/0036098 A1 | 3/2002 | Okuhara et al. | |
| 2011/0265286 A1* | 11/2011 | Paku | B60R 16/0222 16/2.2 |
| 2015/0129303 A1* | 5/2015 | Shitamichi | B60R 16/0222 174/72 A |
| 2018/0261360 A1* | 9/2018 | Ujita | B60R 16/0207 |

* cited by examiner

B-B cross section

A-A cross section

GROMMET

CROSS-REFERENCE TO RELATED APPLICATIONS

This application is based on and claims priority under 35 USC 119 from Japanese Patent Application No. 2018-168716 filed on Sep. 10, 2018, the contents of which are incorporated herein by reference.

TECHNICAL FIELD

The present invention relates to a grommet, and particularly relates to a grommet which is mounted to a through hole for protecting a wire harness that penetrates the through hole formed in a vehicle body panel.

BACKGROUND ART

In related art, a grommet is in a watertight manner fitted to a through hole formed in a vehicle body panel of a vehicle such as an automobile, and a wire harness is inserted into the grommet in the watertight and irremovable manner.

The grommet includes an inner side harness insertion portion into which the wire harness is inserted, a substantially truncated cone shaped (so-called bowl-like) inner side tubular portion integrated with the inner side harness insertion portion at a small diameter side end, and a panel abutment portion integrally formed at a large diameter side end of the inner side tubular portion. The panel abutment portion cannot enter the through hole, and a vehicle body lock recess is formed at a boundary between the inner side tubular portion and the panel abutment portion. Therefore, the inner side tubular portion is pulled toward an inner side (a direction of the small diameter side end), so that an outer circumference of the inner side tubular portion is reduced in diameter while sliding into the through hole, and the vehicle body lock recess is fitted into the through hole. When a force in a direction away from the inner side is applied by pulling an outer side portion toward an outer side after mounting, the vehicle body lock recess may be removed from the through hole since the vehicle body lock recess is stretched and an outer diameter is reduced (for example, see Patent Literature 1).

Therefore, a grommet is disclosed in which the panel abutment portion is difficult to be removed from the through hole even if the panel abutment portion is pulled toward the outer side. More specifically, in the grommet, an annular inner side lip that can enter the through hole and an annular outer side lip that cannot enter the through hole are integrally formed, a fitting portion is formed at a boundary between an outer circumferential edge of the inner side lip and an outer circumferential edge of the outer side lip, and an outer circumference of a cylinder into which the wire harness is inserted and an inner circumference of the inner side lip are connected by a connection portion. At this time, since a position where the connection portion is connected at the inner side lip is between a position where the connection portion is connected at the cylinder and a position of the fitting portion, the connection portion is axially contracted and an outer diameter of the fitting portion is increased when a force is applied to push the cylinder in a fitting portion direction, so that a remarkable effect is obtained that mounting is ensured and stability is enhanced (for example, see Patent Literature 2).

CITATION LIST

Patent Literature

Patent Literature 1: JP-A-2002-171646 (Pages 4 to 6, FIG. 2)
Patent Literature 2: JP-A-2007-276558 (Pages 7 to 8, FIG. 1)

SUMMARY OF INVENTION

The grommet disclosed in Patent Literature 1 is mounted by pulling the inner side portion toward the inner side (the direction of the small diameter side end), and the outer side portion does not include a part gripped by an operator, so that the outer side portion cannot be pushed toward the inner side. In addition, if the outer side portion is pushed toward the inner side, an excessive force may be required since an outer circumference of the inner side portion tries to increase in diameter between a sliding position and the outer side portion.

An outer diameter of the inner side lip of the grommet disclosed in Patent Literature 2 is small (thin) at a front end, gradually increases (is thickened) toward the fitting portion, and then decreases (is thinned), so that an outer circumference of the inner side lip has a substantially mountain shape cross section. The inner side lip is connected at a position of an inner circumferential side corresponding to a range where the outer diameter gradually decreases toward the fitting portion. For this reason, when the grommet is mounted to the through hole, the grommet first slides into the through hole (slides in a direction to climb a mountain) in a range where the outer diameter of the inner side lip gradually increases toward the fitting portion. In this way, between a sliding position (outer circumference) and a position (inner circumference) where the connection portion is connected, the inner side lip is increased in diameter by receiving an axial compressive force (a mountain on which a compressive force works in a range including a summit thereof becomes high). Therefore, an excessive force is required when the grommet is mounted by pulling or pushing the cylinder toward the inner side.

An object of the present invention is to solve the above problems, and to provide a grommet that can be easily mounted to a through hole by being pushed toward the inner side.

A grommet according to the present invention is a grommet mounted to a through hole formed in a vehicle body panel, and includes a first harness insertion portion that extends toward a first side of the vehicle body panel, through which a wire harness penetrates; a second harness insertion portion that extends toward a second side of the vehicle body panel opposite to the first side, through which a wire harness penetrates; a lip mountain integrated with the first harness insertion portion; a panel abutment portion that abuts on a periphery of the through hole in a surface of the second side in the vehicle body panel; a connection portion that connects the lip mountain and the panel abutment portion; a work unit formed across the second harness insertion portion and the panel abutment portion; and a plurality of work pressing portions integrated with the second harness insertion portion and the work unit. A recess is formed between the work pressing portions.

In addition, a plurality of the recesses are radially formed about a central axis of the second harness insertion portion.

The grommet according to the present invention includes work pressing portions and the recesses are formed between the work pressing portions. Therefore, when the operator holds the work unit and pushes the work unit toward the inner side, the work unit does not become flat with a predetermined rigidity, and is easily bent and gripped, thereby improving workability. In addition, since the work pressing portions are not a substantially columnar body of the whole circumference, the weight corresponding to the volume of the recesses is reduced.

DESCRIPTION OF EMBODIMENTS

Hereinafter, a grommet according to a first embodiment of the present invention will be described with reference to the drawings. Since the drawings are for schematic illustration, shape and size of each member, or positional relationship between members is not limited to the illustrated embodiment. In order to avoid complication of the drawings, some of the signs may be omitted.

First Embodiment

Figure 1:
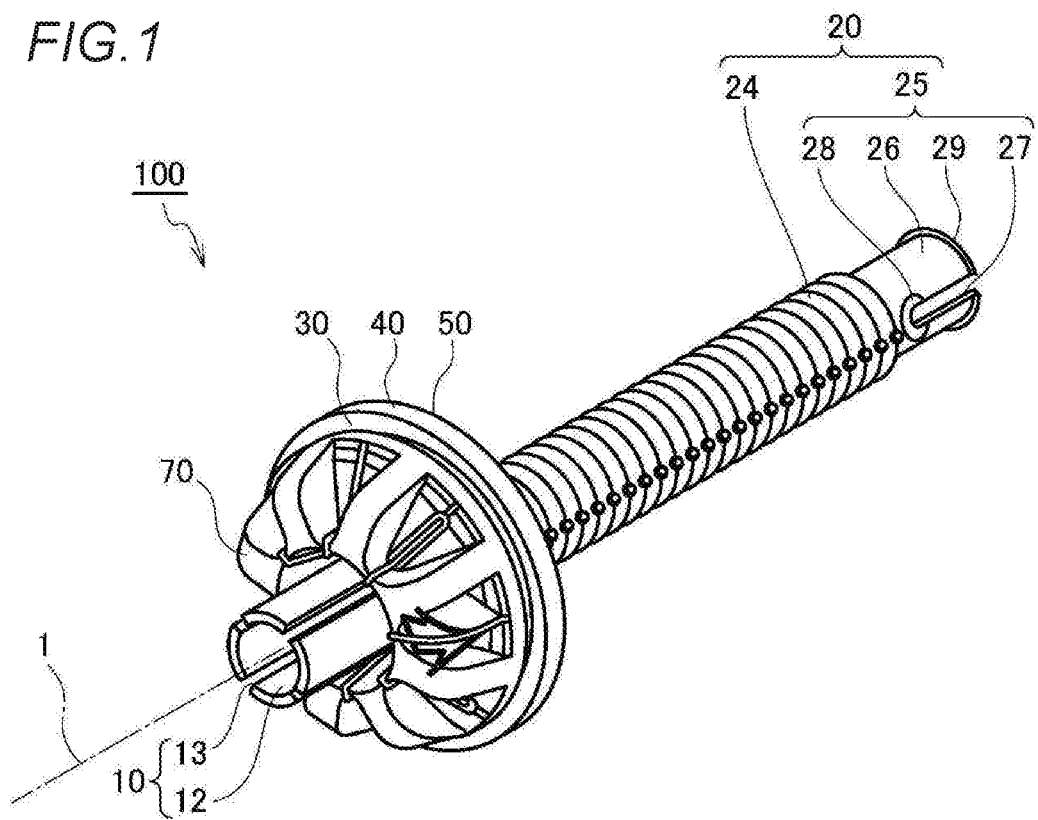
FIG. 1 is a perspective view schematically illustrating a structure of a grommet according to a first embodiment of the present invention, as obliquely viewed from an inner side.
Figure 2:
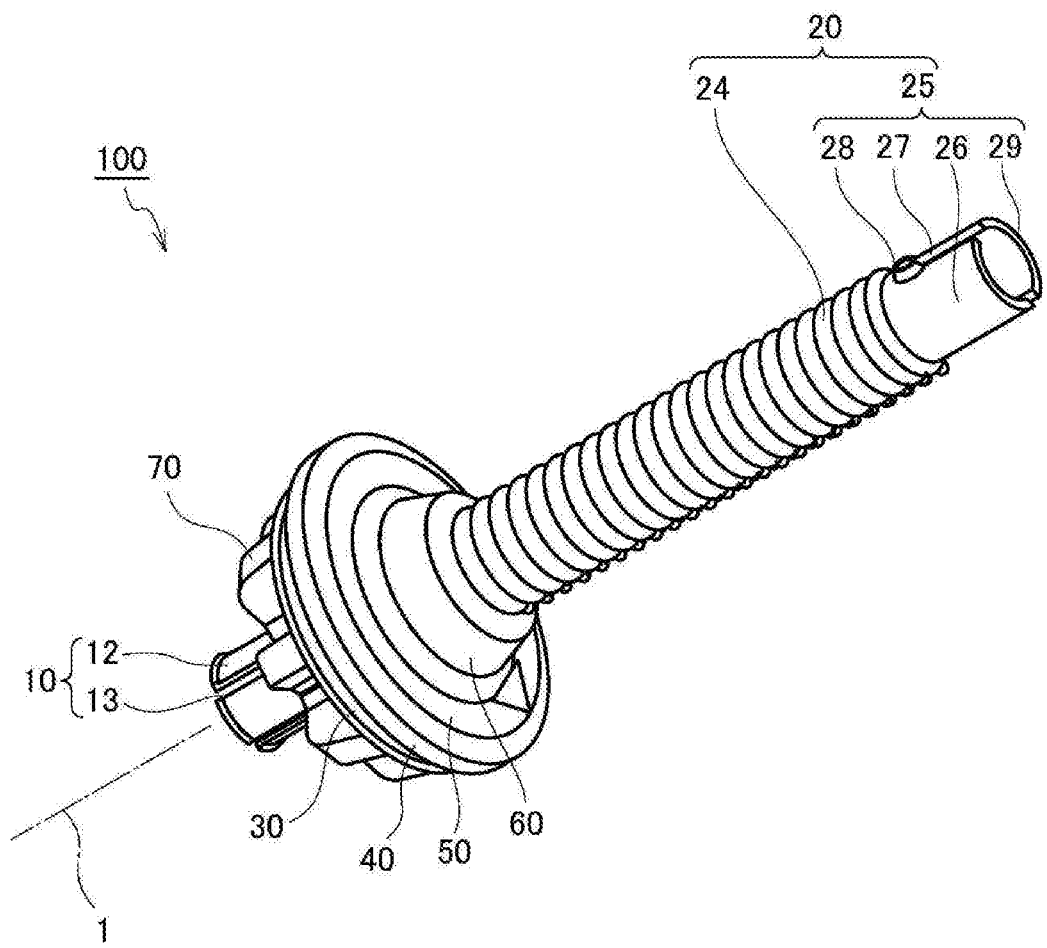
FIG. 2 is a perspective view schematically illustrating the structure of the grommet according to the first embodiment of the present invention, as obliquely viewed from an outer side.
Figure 3:
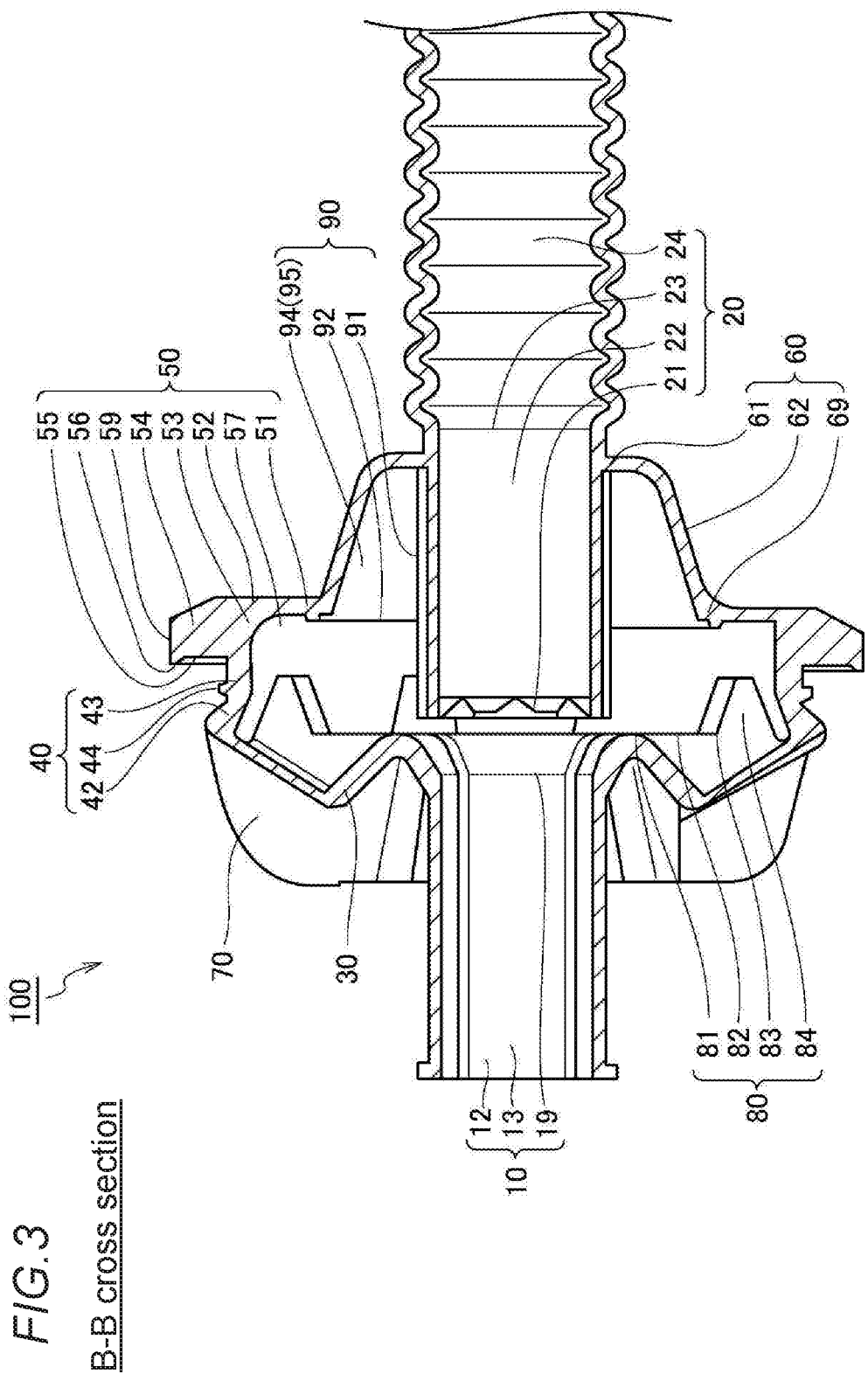
FIG. 3 is a cross-sectional side view (a B-B cross section shown in FIG. 5) schematically illustrating the structure of the grommet according to the first embodiment of the present invention.
Figure 4:
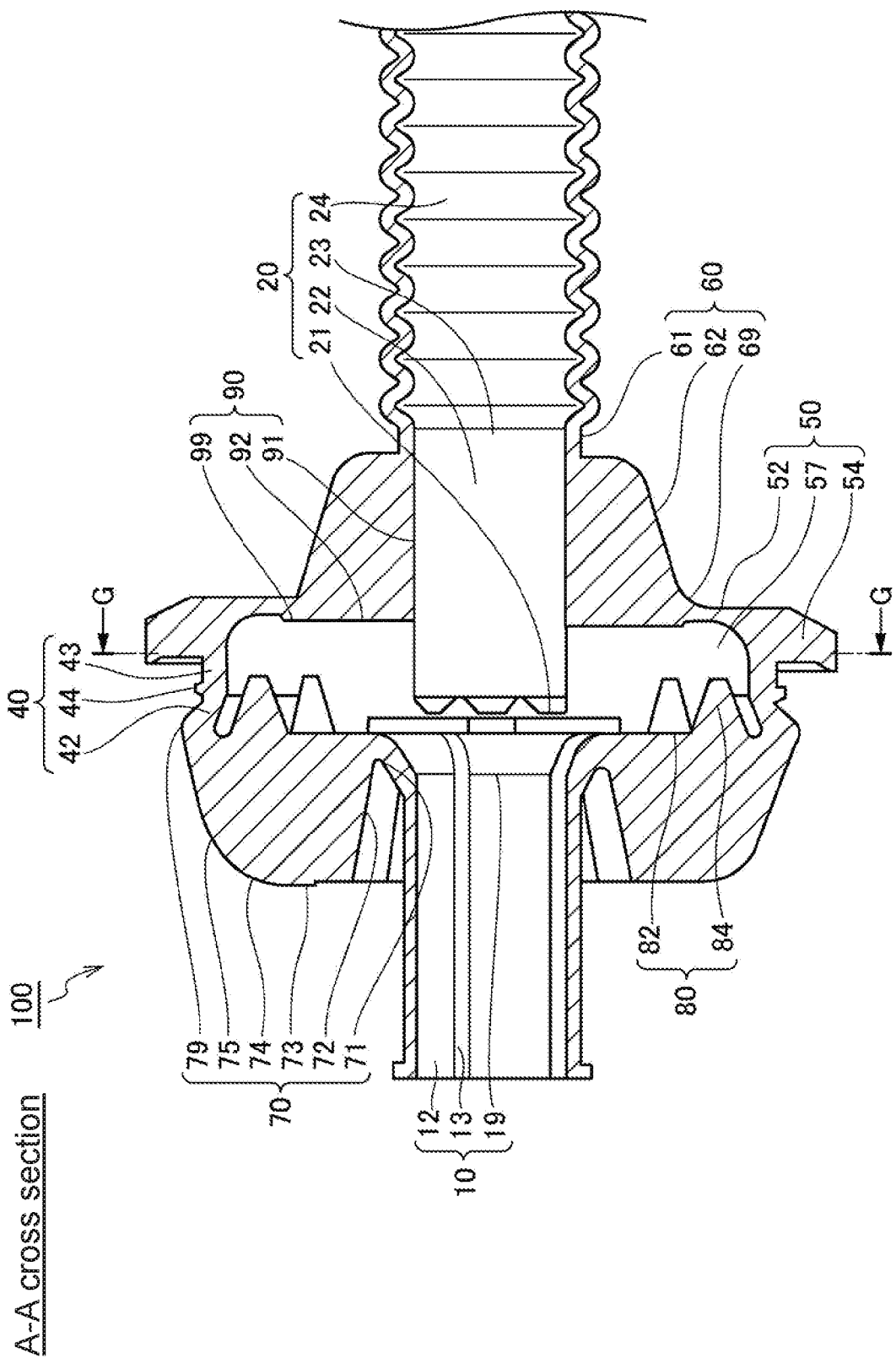
FIG. 4 is a cross-sectional side view (an A-A cross section shown in FIG. 5) schematically illustrating the structure of the grommet according to the first embodiment of the present invention.
Figure 5:
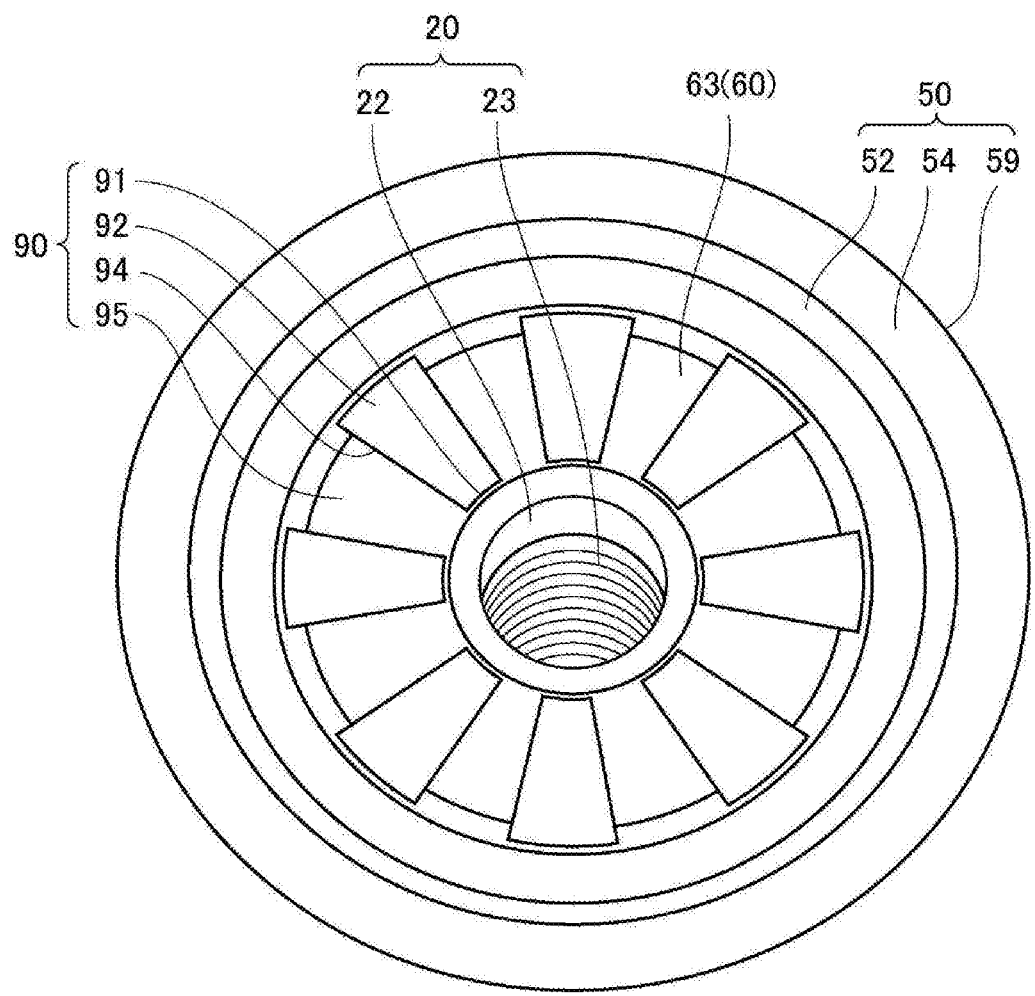
FIG. 5 is a perspective view of a part (work pressing portions) obliquely viewed from the outer side, schematically illustrating mounting procedure of the grommet according to the first embodiment of the present invention.

FIGS. 1 to 5 schematically show a structure of the grommet according to the first embodiment of the present invention, in which FIG. 1 is a perspective view as obliquely viewed from an inner side, FIG. 2 is a perspective view as obliquely viewed from an outer side, FIG. 3 is a cross-sectional side view, FIG. 4 is a cross-sectional side view, and FIG. 5 is a perspective view of a part (work pressing portions) obliquely viewed from the outer side.
(Overall Configuration)

In FIGS. 1 and 2, a grommet 100 is provided for protecting a wire harness (not shown) that penetrates a through hole formed in a vehicle body panel of a vehicle such as an automobile. Hereinafter, a case where the grommet 100 is pushed into a through hole 8 from a vehicle exterior side (an outer side, a first side) toward a vehicle interior side (an inner side, a second side) will be described. The present invention is not limited to be mounted to the through hole 8 formed in a vehicle body panel 9, and is also mounted to through holes formed in various structures and various devices. In addition, the grommet 100 may be pushed into the through hole 8 from the vehicle interior side (the inner side) toward the vehicle exterior side (the outer side).
(Indoor Side Harness Insertion Portion and Outer Side Harness Insertion Portion)

An inner side harness insertion portion (corresponding to a first harness insertion portion in claim) 10 includes arc pieces 12 having an arc shape in cross section, and axially parallel slits 13 are formed between side edges of the arc pieces 12. A lip mountain base 30 is integrated with a rear end 19 (see FIG. 3).

An outer side harness insertion portion (corresponding to a second harness insertion portion in claim) 20 includes a slit-free cylindrical portion 22 between a front end 21 and an intermediate position 23, a corrugated portion 24 connected to the cylindrical portion 22, and a slit portion 25 connected to the corrugated portion 24. A pair of through holes 28 is formed in the slit portion 25, and axially parallel slits 27 are formed between the through holes 28 and a rear end 29. That is, arc pieces 26 having a semicircular cross section are formed so as to be sandwiched by the slits 27.

Since a central axis of the inner side harness insertion portion 10 and a central axis of the outer side harness insertion portion 20 are identical, which are hereinafter referred to as a "central axis 1", a direction toward or a position near the central axis 1 is referred to as "inward" or "inner", and a direction or a position away from the central axis 1 is referred to as "outward" or "outer". In addition, a side of the inner side harness insertion portion 10 is referred to as an "inner side" (in claim, first side), and a side of the outer side harness insertion portion 20 is referred to as an "outer side". Hereinafter, the members will be described in detail with reference to FIGS. 3 to 5.
(Lip Mountain)

Lip mountains 70 each have a substantially rectangular shape in a front view, protrude toward an inner side of the lip mountain base 30, and are equiangularly arranged at eight circumferential positions on the lip base 30, thereby mainly enhancing rigidity of the lip mountain base 30.

The lip mountains 70 are connected to the lip mountain base 30 at a lip mountain inner circumference 71 in a side view, and each include a lip mountain inner surface 72 that gradually extends outward toward the inner side, and a lip mountain inner side surface 73 that is continuous with the lip mountain inner surface 72 and perpendicular to the central axis 1, and a lip mountain arc surface 74 that connects the lip mountain inner side surface 73 and a lip mountain outer surface 75. The lip mountain outer surface 75 shows a substantially straight line that is gradually increased in diameter (outward) toward the outer side (a connection portion 40).

The lip mountain base 30 has a perforated disk shape and is integrated with the inner side harness insertion portion 10 at an inner circumference.
(Intermediate Rib)

Intermediate ribs 80 are equiangularly arranged at eight circumferential positions on an outer side of the lip mountain base 30. At this time, the lip mountains 70 and the intermediate ribs 80 have the same circumferential phases. The intermediate ribs 80 each include an inner circumference 81, an outer side surface 82, and a projection portion 84 on an outer circumferential side of an intermediate position 83 in the side view. Projection portions 84 mainly enhances the rigidity of the lip mountain base 30. Installation of the intermediate ribs 80 may be omitted.

(Work Unit)

A work unit 60 has a substantially bell shape, an inner circumference 61 is connected to the intermediate position 23 of the outer side harness insertion portion 20, and an outer circumference 69 is integrally connected to an inner circumference 51 of a panel abutment portion 50. A side surface 62 gradually approaches inward toward the outer side. The outer circumference 69 and the inner circumference 51 are virtual surfaces defined for convenience of description, and positions thereof are not strictly specified (other joint portions are described such that virtual surfaces are joined to each other).

(Work Pressing Portion and Recess)

A plurality of work pressing portions 90 are integrated across the side surface 62 of the work unit 60 and the cylindrical portion 22 of the outer side harness insertion portion 20. The work pressing portions 90 each have a plate shape, and include an inner circumference 91 connected to the cylindrical portion 22 of the outer side harness insertion portion 20, an outer circumference 99 integrated with the outer circumference 69 of the work unit 60, and an inner side surface 92 substantially flush with a thin portion 52 (perpendicular to the central axis 1). The inner side surface 92 may project toward the inner side more than the thin portion 52.

Mutually facing surfaces of adjacent work pressing portions 90 are referred to as facing surfaces 94, and the work pressing portions 90 are radially equiangularly arranged, so that recesses 95 are formed between the facing surfaces 94 of the work pressing portions 90, and thin portions 63 are formed in ranges corresponding to recesses 95 in the side surface 62 of the work unit 60 (see FIG. 5).

(Panel Abutment Portion)

The panel abutment portion 50 is integrated with the outer circumference 69 of the work unit 60 at the inner circumference 51 in the side view, and includes the thin portion 52 perpendicular to the central axis 1, and a thick portion 54 integrated with an outer circumference (hereinafter referred to as an "intermediate position 53") of the thin portion 52. The thick portion 54 projects toward the inner side more than the thin portion 52 and includes a panel abutment surface 55 perpendicular to the central axis 1. An annular panel abutment projection 56 projecting toward the inner side is formed in an outer circumference 59 of the panel abutment surface 55 (accurately, in a predetermined width range close to the outer circumference 59).

A space 57 is formed by the lip mountains 70, the connection portion 40, and the panel abutment portion 50 (or the work unit 60).

(Connection Portion)

The connection portion 40 connects the lip mountains 70 and the panel abutment portion 50. The connection portion 40 is a thin-walled cylinder, and includes an inclined portion 42 formed on the inner side and inclined so as to be gradually inward toward the outer side, and a parallel portion 43 connected to the inclined portion 42 and parallel to the central axis 1. A projection portion 44 projecting from an outer surface of the parallel portion 43 is formed.

(Mounting Procedure)

Figure 6:
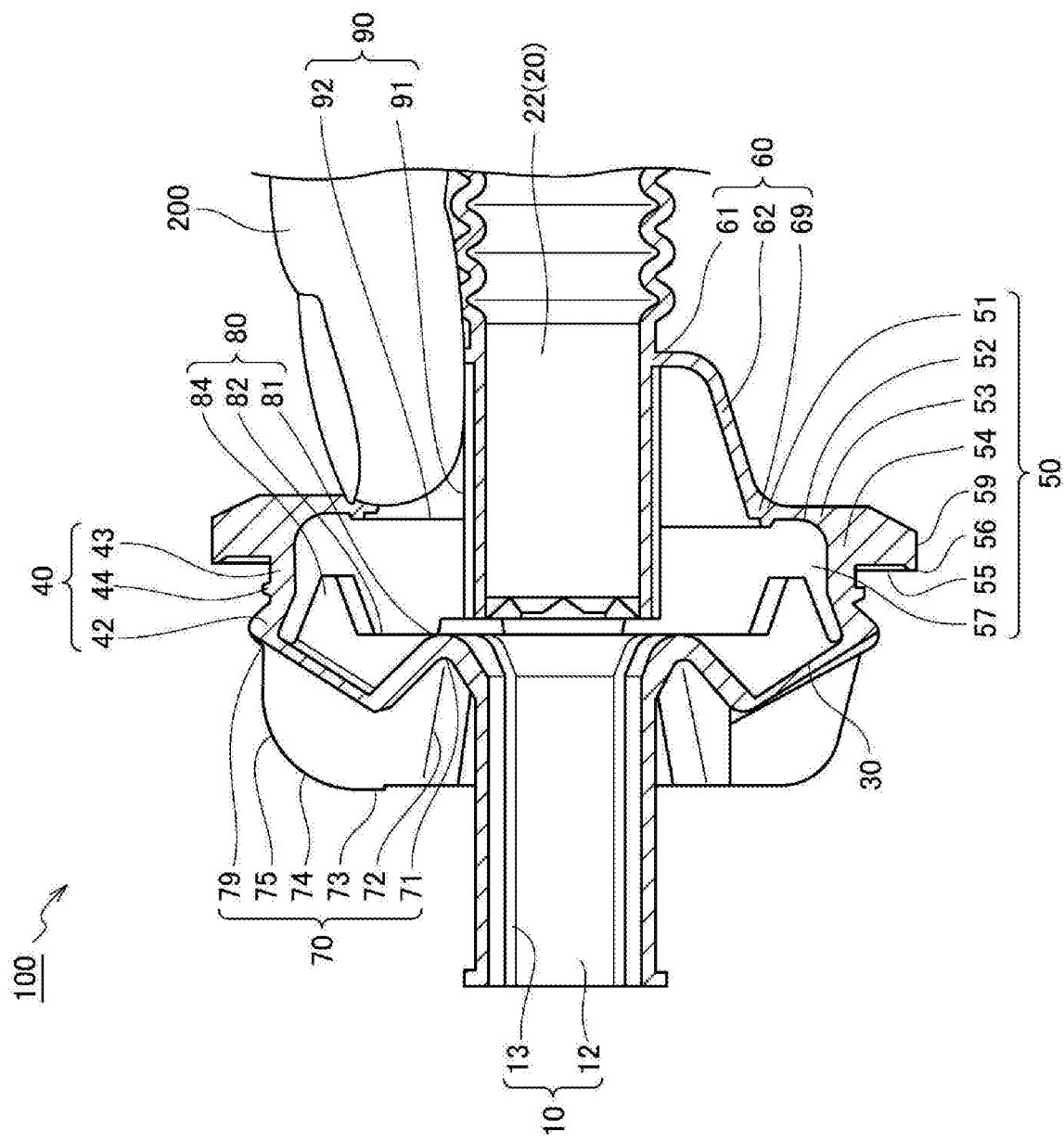
FIG. 6 is a cross-sectional side view schematically illustrating the mounting procedure of the grommet according to the first embodiment of the present invention, and shows a working situation.
Figure 7:
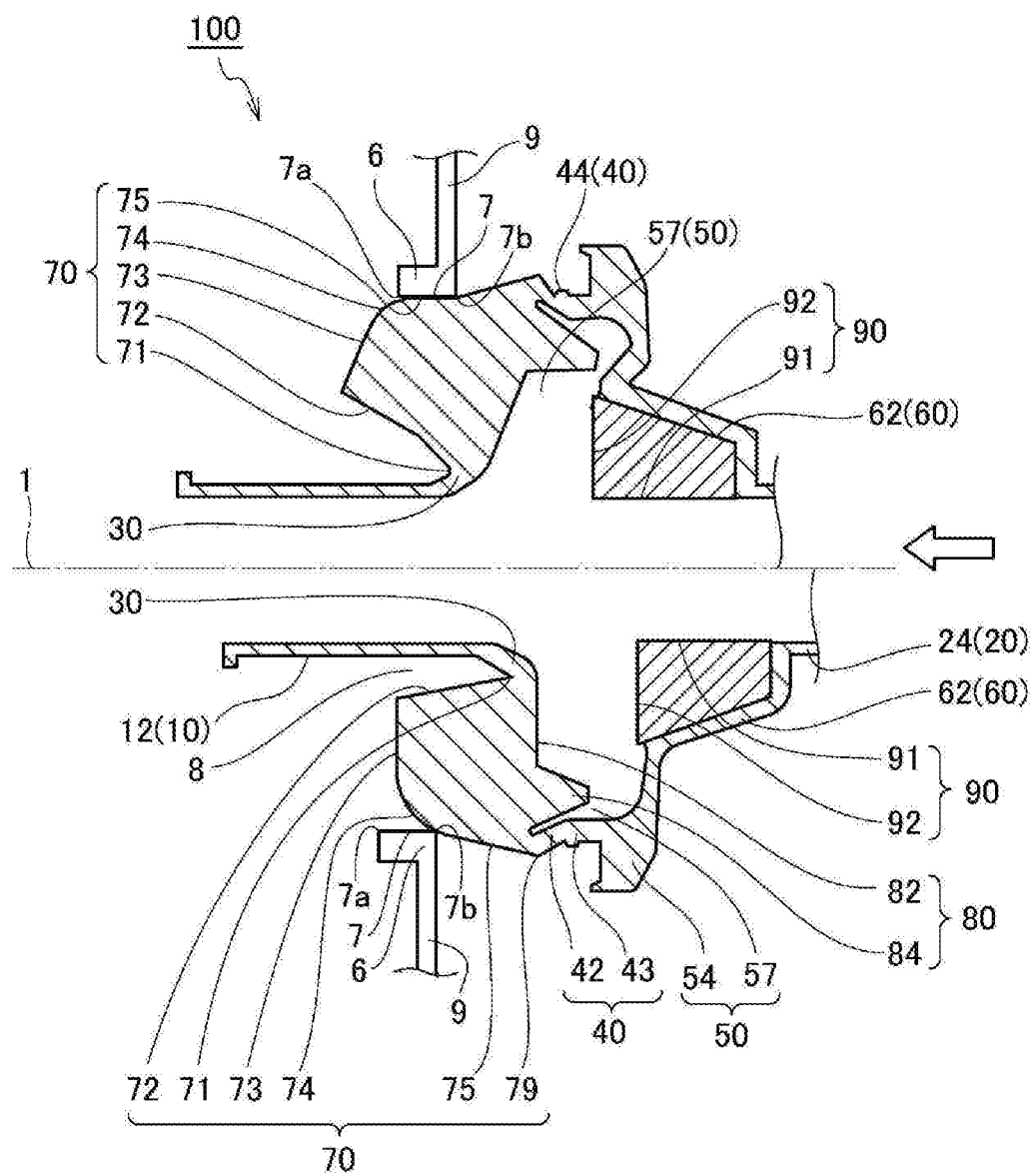
FIG. 7 is a cross-sectional side view schematically showing the grommet mounting procedure according to the first embodiment of the present invention, in which a lower side of a central axis 1 shows a beginning of mounting, and an upper side of the central axis 1 shows the mounting in progress.

FIGS. 6 and 7 are cross-sectional side views schematically illustrating mounting procedure of the grommet according to the first embodiment of the present invention, in which FIG. 6 shows a working situation, a lower side of the central axis 1 in FIG. 7 shows a beginning of mounting, and an upper side of the central axis 1 in FIG. 7 shows the mounting in process.

In FIG. 6, an operator holds the side surface 62 of the work unit 60 with a finger 200.

At the beginning of the mounting shown below the central axis 1 in FIG. 7, the lip mountain 70 is intruded into the through hole 8. At this time, the lip mountain arc surface 74 of the lip mountain 70 abuts on an outer side end of a through hole inner circumference 7 of the through hole 8 (hereinafter referred to as a "through hole rear end 7*b*") formed in the vehicle body panel 9. A flange 6 is provided in the through hole 8, and an inner side end of the flange 6 is referred to as a "through hole front end 7*a*" for convenience of description.

During the mounting shown on the upper side of the central axis 1 in FIG. 7, the lip mountain 70 is pushed into the through hole 8. At this time, since the work unit 60 is pushed toward the inner side, the connection portion 40 is pushed into the through hole 8 via the panel abutment portion 50. Therefore, the lip mountain arc surface 74 is reduced in diameter by moving to the inner side while sliding on the through hole inner circumference 7, and the lip mountain outer surface 75 subsequently slides on the through hole inner circumference 7. As a result, when further pushed, a lip mountain outer circumference 79 of the lip mountain outer surface 75 separates from the through hole inner circumference 7, so that the through hole inner circumference 7 is fitted to the connection portion 40, and the projection portion 44 is brought into close contact with the through hole inner circumference 7 (not shown).

(Function and Effects)

As described above, since the work pressing portions 90 straddling the work unit 60 and the outer side harness insertion portion 20 are formed in the work unit 60, the work unit 60 has a predetermined rigidity. Therefore, even if the operator grips with the finger 200, the work unit 60 does not become flat. Since the recesses 95 are formed between the facing surfaces 94 of the work pressing portions 90, when the operator grips the work unit 60 and pushes the work unit 60 toward the inner side, the work unit 60 is easily bent and gripped. Therefore, workability is improved. Since the work pressing portions 90 are not a substantially columnar body of the whole circumference, the weight corresponding to the volume of the recesses 95 is reduced.

The present invention has been described above based on the first embodiment. It should be understood by those skilled in the art that the first embodiment is an example, and various modifications can be made to the components and combinations thereof, and such modifications are also within the scope of the present invention.

INDUSTRIAL APPLICABILITY

Since the present invention has been described above, the present invention can be widely used as various grommets mounted in through holes formed in plate materials in various structures.

What is claimed is:

1. A grommet which is mounted to a through hole formed in a vehicle body panel comprising:
   a first harness insertion portion that extends toward a first side of the vehicle body panel, through which a wire harness penetrates;
   a second harness insertion portion that extends toward a second side of the vehicle body panel opposite to the first side, through which a wire harness penetrates;

a lip mountain integrated with the first harness insertion portion;

a panel abutment portion that abuts on a periphery of the through hole in a surface of the second side in the vehicle body panel;

a connection portion that connects the lip mountain and the panel abutment portion;

a work unit formed across the second harness insertion portion and the panel abutment portion, configured to cause, when the work unit is pressed, the lip mountain to slide through the through hole in a first direction towards the first side of the vehicle body panel such that the grommet mounts to the through hole in the first direction, and located on a side of the lip mountain in a second direction towards the second side of the vehicle body panel; and a plurality of work pressing portions integrated with the second harness insertion portion and the work unit, wherein a plurality of recesses are formed between the work pressing portions, and a surface of the work unit, that is configured to be pushed in the first direction so as to cause the grommet to mount to the through hole, covers the plurality of work pressing portions and the plurality of recesses in the second direction.

2. The grommet according to claim 1, wherein
the plurality of recesses are radially formed about a central axis of the second harness insertion portion, such that each of the plurality of recesses are separated from each other in a circumferential direction about the central axis.

3. The grommet according to claim 1, wherein
the work unit is connected to the second harness insertion portion at an inner circumference of the work unit, and connected to the panel abutment portion at an outer circumference of the work unit.

4. The grommet according to claim 3, wherein
a diameter of the work unit decreases continuously, in the second direction, along at least a portion of the work unit.

5. The grommet according to claim 3, wherein
the outer circumference of the work unit is connected to an inner circumference of the panel abutment portion,
the connection portion has a cylinder shape, and
an outermost circumference of the panel abutment portion is larger than an outermost circumference of the connection portion, and is larger than the outer circumference of the work unit.

6. The grommet according to claim 1, wherein
each of the plurality of work pressing portions has a plate shape and the plurality of work pressing portions are configured to prevent the work unit from becoming flat when the work unit is gripped with a finger, and
the plurality of recesses are configured to allow the work unit to become bent when the work unit is pushed in the first direction.

\* \* \* \* \*